United States Patent [19]

Sprague

[11] 4,370,030
[45] Jan. 25, 1983

[54] EXTENDED RESOLUTION LIGHT DEFLECTOR USING SURFACE ACOUSTIC WAVES

[75] Inventor: Robert A. Sprague, Saratoga, Calif.

[73] Assignee: Xerox Corporation, Stamford, Conn.

[21] Appl. No.: 153,380

[22] Filed: May 27, 1980

[51] Int. Cl.³ .............................................. G02F 1/11
[52] U.S. Cl. .................................... 350/358; 350/356
[58] Field of Search ................................ 350/356, 358

[56] References Cited

U.S. PATENT DOCUMENTS

| 3,568,102 | 3/1971 | Tseng | 350/358 |
| 3,958,862 | 5/1976 | Scibor-Rylski | 350/356 |
| 4,004,847 | 1/1977 | McNaney | 350/358 |

Primary Examiner—William L. Sikes
Assistant Examiner—Leon Scott
Attorney, Agent, or Firm—Franklyn C. Weiss

[57] ABSTRACT

A light modulator/deflector which uses acoustic surface waves wherein an illuminating beam 10 enters the side of and strikes the active surface 18 of a transparent and electrooptic acoustic substrate 12 near the grazing angle of incidence and is reflected off that surface 18 through the remaining portion of substrate 12 and out the other side thereof into at least a zero order undiffracted direction and a first order diffracted direction. The light 10 is collimated so that it interacts with as much of the acoustic wave 20 as possible. A set of interdigital electrodes 16 is evaporated on this surface 18 so as to launch acoustic waves 20 in a direction normal to the plane of incidence of the light. Along the path of the travelling acoustic wave in the same substrate are placed one or more repeater acoustic wave sources 72, 74 to boost the decaying acoustic wave 62 back to its original power level.

11 Claims, 6 Drawing Figures

EXTENDED RESOLUTION LIGHT DEFLECTOR USING SURFACE ACOUSTIC WAVES

The invention relates to a light modulator/deflector which uses acoustic surface waves; the modulator/deflector utilizing a transparent acoustic and piezoelectric substrate in which surface acoustic waves are generated to effect the modulation or deflection of an input beam of light. By using an additional set or sets of surface wave generators spaced apart from the initial set, a positive boost to the originally launched acoustic wavefronts can be effected when the signals are in the proper phase relationship to the other to achieve compensation for acoustic attenuation, thus achieving enhanced scan resolution.

BACKGROUND OF THE INVENTION

From 1885 when Lord Rayleigh first described the acoustic waves that travel along the earth's surface due to earthquakes to present day use in scanning and communication systems, scientists have been interested in the action of acoustic waves in solid materials. It was demonstrated several years ago by workers at Bell Telephone Laboratories that ultrasonic waves with frequencies of a billion hertz and up are capable of travelling several centimeters through a solid medium. Best known, of course, for the use of acoustic waves in a solid medium is the piezoelectric crystal. Compression of such a crystal generates an electrostatic voltage across it and, conversely, application of an electric field may cause the crystal to expand or contract in certain directions.

In recent years, the acoustic wave technology expanded rapidly after the development of the interdigital transducer, an efficient type of transducer for converting an electrical signal into an acoustic surface wave and for reconverting the acoustic wave back into an electrical signal. When such an interdigital transducer is placed on a piezoelectric material such as quartz or lithium niobate ($LiNbO_3$), and a rapidly changing electrical signal is applied to the transducer, the piezoelectric material will vibrate in unison with the electrical signal, generating a sound wave.

Combining the use of acoustic waves and optical light sources is known as acousto-optics. Acousto-optics is commonly used for achieving modulation and scanning of laser beams. This is normally done by using bulk acoustic waves which produce index of refraction variations within a material. These index of refraction variations interact with a laser beam causing diffraction of the beam. By turning the acoustic wave on and off, the amount of diffraction can be changed, achieving modulation of the diffracted light. By changing the frequency of the acoustic wave, the direction of diffraction can be changed, resulting in scanning of the output beam in angle.

The same type of deflection and modulation has been achieved, as shown in the art, by interaction of the light with acoustic surface waves. Use of surface waves rather than bulk waves is advantageous because attenuation can be lower (resulting in potentially higher resolution from a scanner), acoustic velocity is slower (resulting in smaller devices), and high frequency transducers are easier to fabricate. However, achieving interaction of light with waves is difficult. In order to achieve interaction of the light wave with the acoustic surface wave, two modes of interaction can be utilized.

The most common technique, which is described in the literature, is to couple light into a thin film waveguide on the device surface, interact with the surface wave, and then couple out. For example, see an article by Yoshiro Ohmachi in the Journal of Applied Physics, Vo/44, No. 9, September 1973, pp 3928–3933 entitled, "Acousto-Optical Light Diffraction in Thin Films". An alternative mode of interaction is to couple light into a thicker crystal through a side adjacent to the active surface, allow it to totally internally reflect off the active surface at near grazing incidence, and leave the crystal through the other adjacent face. Such a device is described in a copending application entitled, "Light Modulator/Deflector Using Acoustic Surface Waves", by Robert Sprague and Dror Sarid.

According to the present invention, a technique is described for using acoustic surface waves to produce light deflectors. The interaction between the light and the acoustic waves is achieved in either of the modes described above. Along the path of the travelling acoustic wave in the same active device are placed one or more repeater acoustic wave sources to boost the decaying acoustic wave back to its original power level, achieving enhanced scan resolution as compared to a single transducer device.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1A:
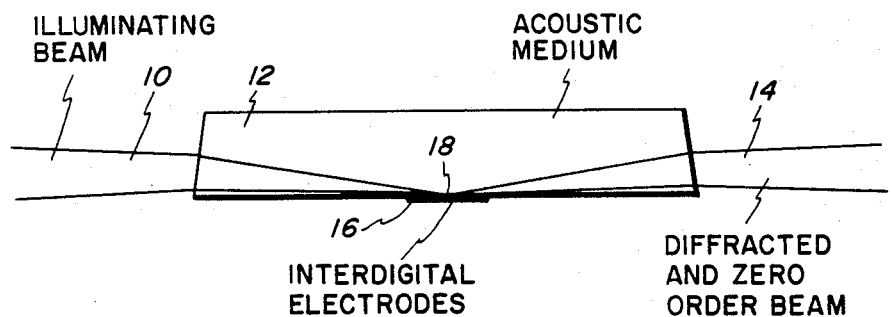
FIGS. 1A and 1B are side and top views respectively of a TIR acoustic medium impinged from the side by an illuminating light beam.

FIGS. 1 and 2 depict the basic geometry of devices utilized in the present invention. For the TIR (Total Internal Reflection) mode of interaction, the illuminating beam 10 enters the side of a transparent acoustic material 12, strikes the active surface 18 of the acoustic material 12 near the grazing angle of incidence, and is reflected off that surface 18 through the remaining portion of the acoustic material 12 and out the other side thereof. The illuminating beam 10 could be, for instance, a HeNe (helium-neon) laser source, while the transparent acoustic medium 12 could be $LiNbO_3$ (lithium niobate).

The light 10 is made to converge in the plane of incidence so that it comes to focus on the active surface 18 of the acoustic device. A set of interdigital electrodes 16 is evaporated on this surface 18, in the known prior art techniques, so as to launch acoustic waves 20 in a direction normal to the plane of incidence of the light. This direction would be into the page in FIGS. 1A and 2A and up the page in FIGS. 1B, 2B and 3.

The light 10 thus crosses the acoustic beam 20 in a direction parallel to the acoustic wavefronts. Good interaction between the light 10 and the sound 20 is insured since the sound waves cross the beam at the focus location 18 where the beam is narrow in height, and strike the reflecting surface near grazing incidence to assure a long interaction length. When the light beam 10 interacts with the acoustic wavefronts 20, and output diffracted (first order) beam 90 is generated; while without the effects of the acoustic wavefronts, the light beam 10 passes through undiffracted 92, commonly termed the zero order of the beam. A total internal reflection geometry for interaction has been shown by Dror Sarid and G. I. Stegeman, in "Light Scattering On Internal Reflection From Surface Acoustic Waves", paper FO12, Optical Society of America annual meeting in Toronto, Canada, Oct. 10-14, 1977, to enable good diffraction efficiency of the light, an essential figure of merit for fabrication of usable acousto-optic devices.

Figure 1B:
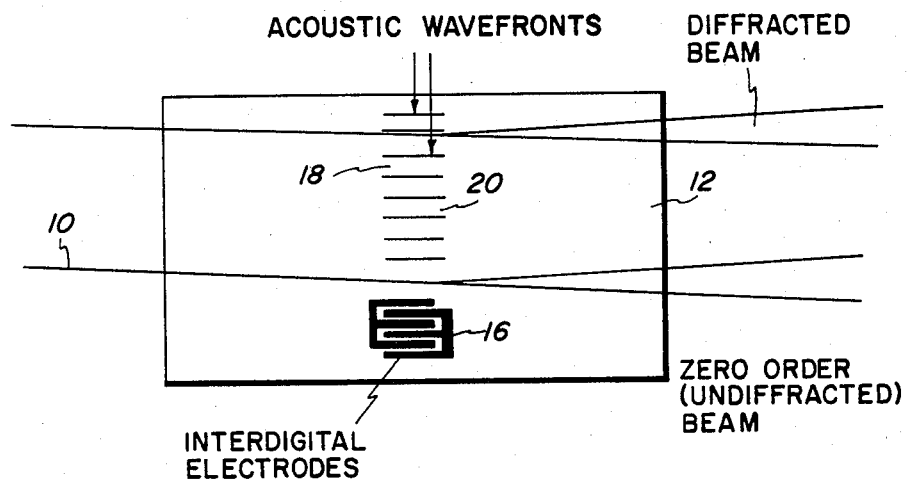
Figure 2A:
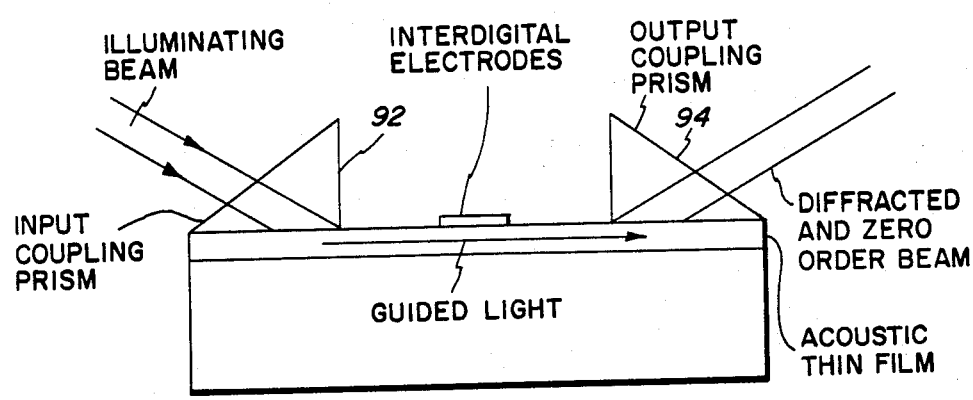
FIGS. 2A and 2B are side and top views respectively of a thin film acoustic device.
Figure 2B:
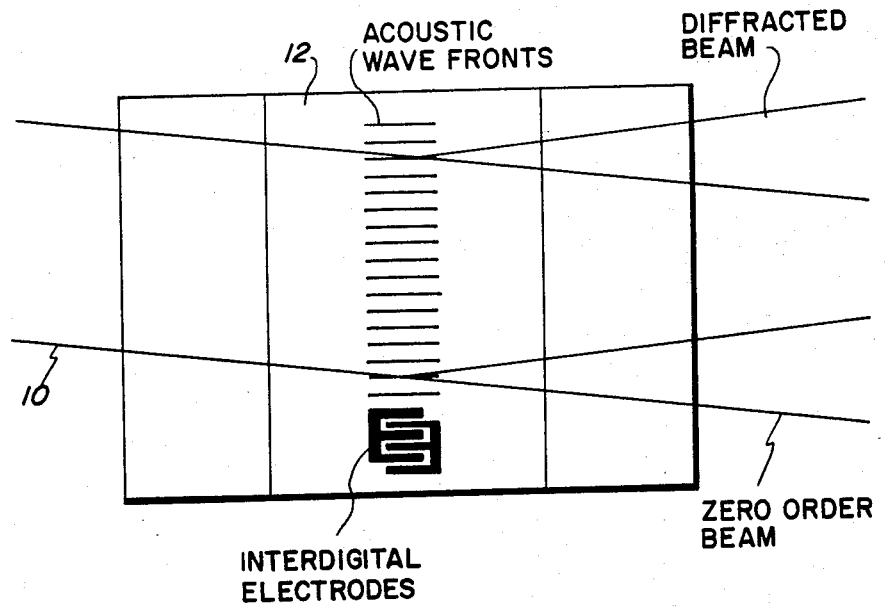

FIG. 2 shows an alternative thin film approach to coupling the light with the acoustic wave. In this case, the light beam 10 is collimated in both directions, but with a highly rectangular aspect ratio. This light is coupled into the thin film waveguide 42 with the aid of prism coupler 44. It then is guided by the thin film so that it interacts with the acoustic beam 46 and exits the crystal through an output prism 48. Other coupling schemes such as butt coupling and grating coupling could also be used without changing the basic concept involved, and the beam expansion could be done in the thin film, as for example with a geodesic lens. The light 10 is collimated in the other direction, as shown in FIGS. 1B, 2B and 3, so that it interacts with as much of the acoustic wave 20 as possible.

The basic geometry of the surface wave transducers shown in FIGS. 1 and 2 would, of course, be somewhat different in a practical device. Modifications must be made to account for diffraction of the acoustic wave, as differentiated from the light wave, Bragg angle matching of the wavefront direction and light beam propagation directions, multiple transducers for wideband operation, and heat sinking to avoid device overheating. However, the basic principles of the invention shown and described in conjunction with FIGS. 1 and 2 would apply to all such devices.

The number of resolvable spots from a deflector set forth in FIGS. 1 and 2, as limited by the maximum scan angle and the diffraction limited spot size, is given by the number of acoustic wavefronts with which the light beam interacts (the time bandwidth product of the device). This number will be limited by attenuation of the acoustic wave as it crosses the acoustic medium and by diffraction spreading of the acoustic beam, which lowers the acoustic power density a distance away from the interdigital electrodes. The present invention, however, reduces this power density reduction to an acceptable amount by adding repeaters along the path of the acoustic wave. These repeaters consist of surface wave sensors which sense the acoustic signal, amplify it, and feed back to the electrodes which launch a new acoustic wave. Alternatively, the sensors can be eliminated and the additional drive electrodes driven directly, with appropriate phasing of each signal to account for acoustic propogation delay.

Figure 3:
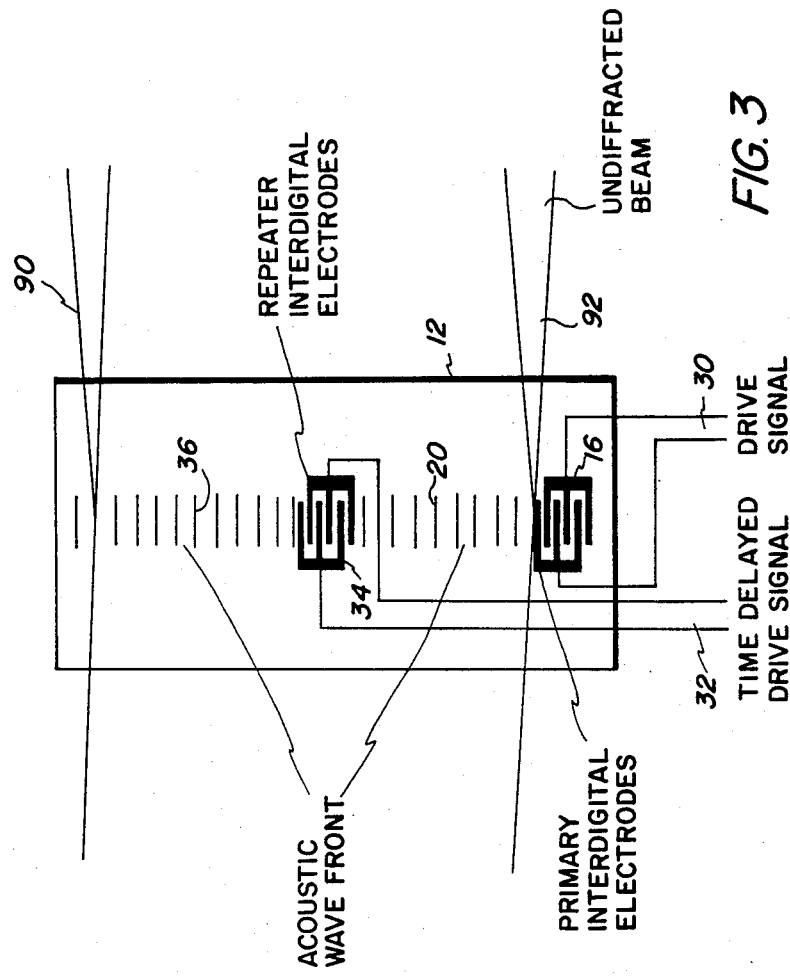
FIG. 3 is a top view of either acoustic medium similar to those seen in FIGS. 1 or 2, with the addition of the repeater acoustic wave source.

FIG. 3 depicts such a configuration for a two electrode device. More electrodes could be added, depending on the size of the transparent acoustic medium, the desired efficiency of the system, and the total number of resolution spots desired.

The initial drive electrode 16 is at the lower edge of acoustic medium 12. As set forth above, one typical acoustic medium is lithium niobate. Drive source 30 causes electrode 16 to launch a surface wave up the medium which becomes attenuated by the time it reaches the middle of the medium 12. At this location the repeater interdigital electrodes 34 could be placed to launch new acoustic waves. By launching a new wave 36 at the middle electrode 34, said wave being in phase with the wave 20 reaching that position from the initial electrode 16, the wave is boosted back to its original power level. That is, electrode 34 would be connected to a time delayed drive signal source 32 which causes electrode 34 to launch its own acoustic wave, which, if in phase from the wavefronts 20 from electrode 16, augments the original wave in the desired repeating action. If the wave generated 36 is not in phase with the wavefronts 20 from electrode 16, the original wavefronts 20 will be attenuated further and even cancelled accordingly.

In the manner described, the length of the interaction region can be extended indefinitely within the confines of the acoustic medium, resulting in a very large time bandwidth product and thus a very large number of scanning spots. Since the electrodes 16 and 34 are on the surface 18 of the acoustic medium 12 and the light 10 is internal to it, their presence does not affect the quality of the focused spot. The same type of repeater configuration can be used with either a thin film surface wave device or a TIR device deflector. The same advantage of larger number of resolvable spots would be obtained by using repeater electrodes for either mode of interaction.

Figure 4:
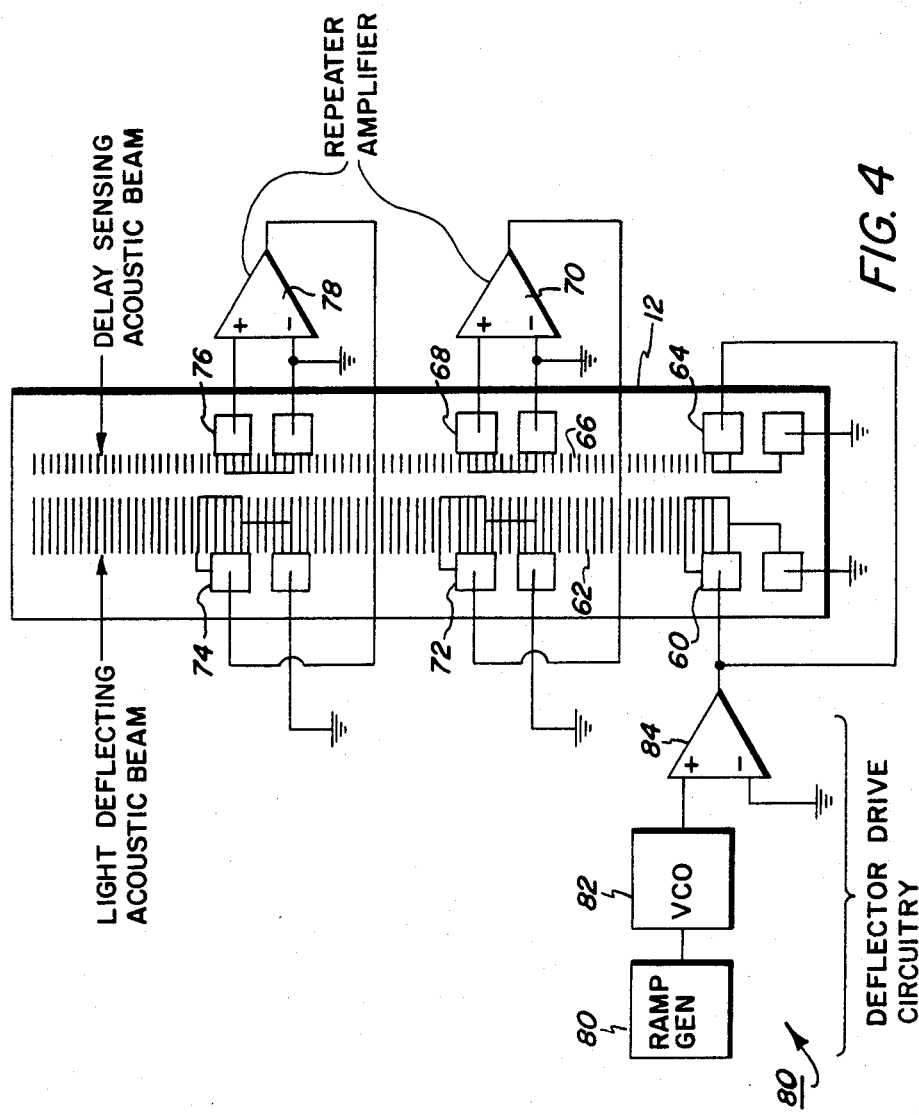
FIG. 4 is a block diagram of one embodiment of the present invention using sequential sensing electrodes.

FIG. 4 shows an alternative way of implementing the repeater electronics using a separate set of repeater transducers 64, 68, 76 built alongside the set of transducers 60, 72, 74 used to produce light diffraction. The initial acoustic waves 62 are launched by transducers 60 upon generation of electrical signals from ramp generator 80, voltage controlled oscillator 82 and amplifier 84 comprising deflector drive circuitry 80. As acoustic waves 62 reach transducers 72, the waves are amplified and continue to move toward transducer 74. These waves also lose power as they move along the substrate, but are again amplified, this time by transducers 74. These acoustic waves are the acoustic beam used to deflect the impinging light sources seen in the earlier figures.

In order for the signal applied to transducers 72 and 74 to amplify the acoustic wavefronts, the transducers 72, 74 must be energized with signals having the proper phase and amplitude. In order to drive these signals at the same time the transducer 60 launches the original acoustic beam, the energizing signal from amplifier 84 is also applied to transducer 64. This transducer launches a parallel beam of acoustic waves 66. Transducer 68 detects the presence and phase of the delay sensing acoustic beam, transfers this information to amplifier 70 which drives amplifying transducer 72 to launch its acoustic wave in the proper phase relationship to original wave 62, as set forth above. Similarly, transducer 76 detects the presence and phase of the acoustic wave reaching it, amplifies the signal by repeater amplifier 78 and applies the proper drive signal to transducer 74. There is no need for amplification of the delay sensing acoustic beam as there is for the light deflecting acoustic beam because all that is needed for the repeating action is the ability to measure the presence and phase of the delay sensing acoustic beam with lesser importance to amplitude as no light is deflected by this beam.

Thus, by building said delay circuitry directly on the substrate in this manner, rather than into delayed driver circuitry, the effect of temperature on acoustic velocity is removed as a source of error.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In an acousto-optic device comprising a piezo-electric substrate (12) having relatively flat sides, a first set of interdigital electrodes (60) on one side of the substrate (12), said electrodes introducing on the surface of said substrate acoustic waves (62) in response to a predetermined electrical deflector signal (80, 82) applied to said interdigital electrodes, an illuminating light beam (10) introduced into said substrate (12) through a side adjacent to the side with said interdigital electrodes (60), said beam directed at said side at an angle such that the light beam suffers total internal reflection near grazing incidence off the active surface where the acoustic waves (62) are generated, in a plane perpendicular to the direction of travel of the acoustic waves, the output beam being reflected from the active surface containing the acoustic waves and leaving said substrate through the remaining portion of said substrate in a zero order undiffracted direction (92) and a first order diffracted direction (90), wherein the improvement is characterized by:

a second set of interdigital electrodes (72) on the same side of said substrate as said first set of interdigital electrodes (60) and in the path of said acoustic waves introduced on the surface of said substrate by said first set (60) of interdigital electrodes, said second set of interdigital electrodes being positioned in said path of said acoustic waves so as to introduce new acoustic waves of the same frequency and in phase with and thereby amplifying the acoustic waves (62) introduced by said first set of interdigital electrodes.

2. An acousto-optic device as set forth in claim 1, further including;

additional sets (74) of interdigital electrodes on the same side of said substrate as said first (60) and second sets (72) of interdigital electrodes and in the path of said acoustic waves introduced on the surface of said substrate by said first and second sets of interdigital electrodes and positioned in said path of said acoustic waves so as to introduce new acoustic waves in phase with and thereby amplifying the acoustic waves introduced by said first and second sets of interdigital electrodes.

3. The acousto-optic device as set forth in claim 2 wherein the electrical signals (80,82) to the interdigital electrodes (60) vary in frequency between predetermined limits so as to provide a predetermined angular scan of the diffracted output light beam from said substrate.

4. The acousto-optic device as set forth in claim 2 wherein the additional sets of interdigital electrodes operate in response to an electrical signal time delayed and in phase with the original electrical signal.

5. The acousto-optic device as set forth in claim 1 or claim 2 further including another set of interdigital electrodes (64) directly adjacent the first set of interdigital electrodes for introducing on the surface of said substrate second acoustic waves (66) in a second parallel path to and at the same frequency as the original acoustic waves (62), an additional set of interdigital electrodes (68) in the path of said second acoustic waves and directly adjacent to said second set (72) of interdigital electrodes for detecting the phase relationship of said second acoustic waves, and means (70) coupled to said additional set of interdigital electrodes (68) to generate an electrical signal to energize the corresponding set (72) of interdigital electrodes to introduce said new acoustic waves in phase with and amplifying the acoustic waves introduced by said first set of interdigital electrodes.

6. The acousto-optic device as set forth in claim 1 further including a third set of interdigital electrodes (64) directly adjacent said first set of interdigital electrodes for introducing on the surface of said substrate second acoustic waves (66) in a second parallel path to and the same frequency as the original acoustic waves (62).

7. The acousto-optic device as set forth in claim 6 further including a fourth set of inter-digital electrodes (68) in the path of said second acoustic waves and directly adjacent to said second set (72) of interdigital electrodes for detecting the phase relationship of said second acoustic waves, and means (70) coupled to said fourth set of interdigital electrodes (68) to generate an electrical signal to energize said second set of interdigital electrodes (72) to introduce said new acoustic waves in phase with and amplifying the acoustic waves introduced by said first set of interdigital electrodes.

8. An acousto-optic device comprising a piezo electric substrate (12), a first set of interdigital electrodes (60) on one side of said substrate (12), and a second set of interdigital electrodes (72) on the same side of said substrate (12) as said first set of interdigital electrodes (60) aligned in a first direction with said first set of interdigital electrodes, the fingers of said second set of interdigital electrodes being parallel to and spaced apart from said first set of interdigital electrodes.

9. The acousto-optic device as set forth in claim 8, further including additional sets (74) of interdigital electrodes on the same side of said substrate as said first (60) and second (72) sets of interdigital electrodes aligned in said first direction as said first and second sets of interdigital electrodes, the fingers of said additional sets of interdigital electrodes being parallel to and spaced apart from the fingers of said first and second sets of interdigital electrodes.

10. The acousto-optic device as set forth in claim 9, further including another set of interdigital electrodes (64) directly adjacent said first set (60) of interdigital electrodes aligned in a second direction with said first set of interdigital electrodes, the fingers of said another set of interdigital electrodes (64) being parallel to and spaced apart from said fingers of said first set (60) of interdigital electrodes.

11. The acousto-optic device as set forth in claim 10 further including further sets of interdigital electrodes 68 aligned in a third direction parallel to said first direction and including said another set of interdigital electrodes (64), said further sets of interdigital electrodes (68) being directly adjacent to said second set (72) of interdigital electrodes, such that there are at least two rows of sets of interdigital electrodes.

* * * * *